United States Patent [19]

Guthrie

[11] 4,235,035
[45] Nov. 25, 1980

[54] TRIPABLE FISHING ROD HOLDER

[76] Inventor: James R. Guthrie, 430 E. Vest St., Marshall, Mo. 65340

[21] Appl. No.: 961,636

[22] Filed: Nov. 17, 1978

[51] Int. Cl.³ .............................................. A01K 91/06
[52] U.S. Cl. ...................................................... 43/15
[58] Field of Search ................................ 43/15, 16, 17

[56] References Cited

U.S. PATENT DOCUMENTS

| | | | |
|---|---|---|---|
| 2,295,250 | 9/1942 | Zenewich | 43/15 |
| 2,744,351 | 5/1956 | Smith | 43/16 |
| 2,803,912 | 8/1957 | Kellar | 43/16 |
| 2,804,277 | 8/1957 | Kinder | 43/15 X |
| 2,811,801 | 11/1957 | Daniel | 43/15 |
| 2,918,746 | 12/1959 | Hamrick | 43/15 |
| 3,016,648 | 1/1962 | Ingersoll et al. | 43/15 |
| 3,170,262 | 2/1965 | Hall | 43/15 |
| 3,412,499 | 11/1968 | Pastrovich | 43/15 |
| 3,837,109 | 9/1974 | De Julio | 43/15 |

Primary Examiner—Nicholas P. Godici
Assistant Examiner—Robert P. Olszewski
Attorney, Agent, or Firm—Schmidt, Johnson, Hovey & Williams

[57] ABSTRACT

An automatic fish snagger has a tiltable, spring-loaded tube for receiving the handle of a fishing rod, the tube being normally "cocked" through use of a latch which is tripped as the result of a tug on the line by the fish. The spring then swings the tube, and therefore the rod, in a direction to "set" the hook. The geometry of the device is such that when making one or more of a number of adjustments, the fisherman can be assured of a catch under various conditions whenever the fish either "strikes" or takes the bait, all before the bait can be ejected from the mouth upon discovery of the hook.

3 Claims, 3 Drawing Figures

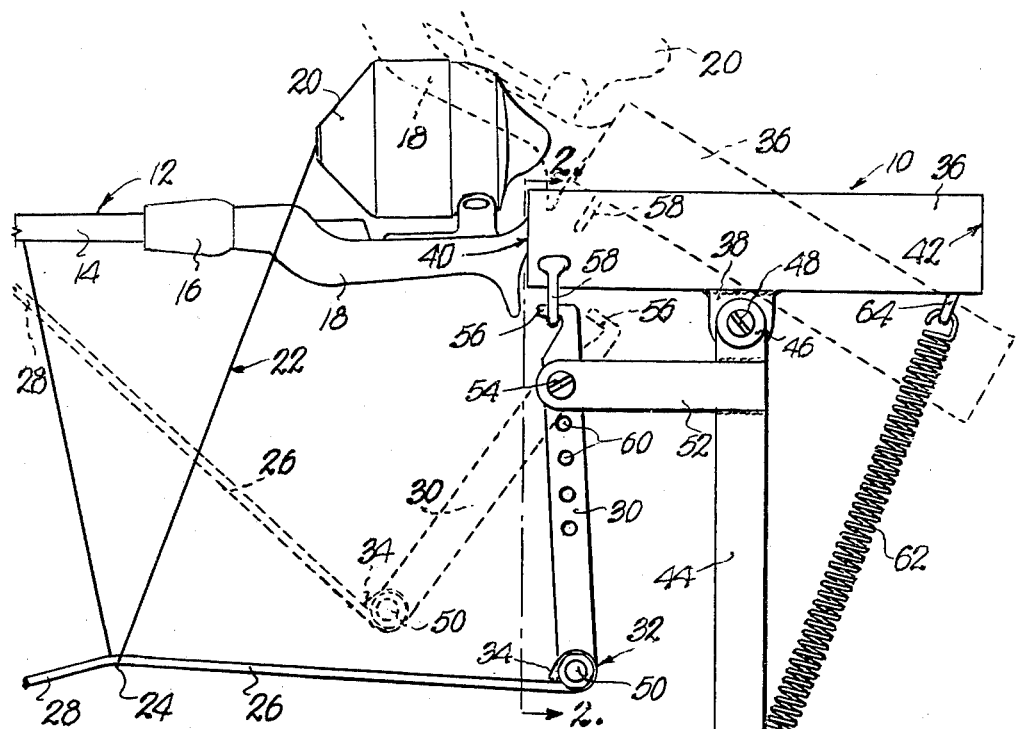
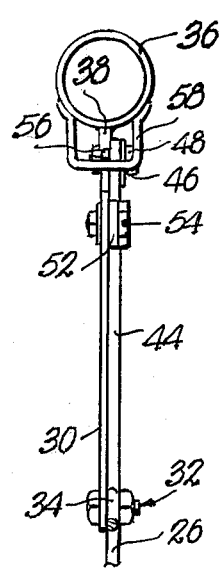
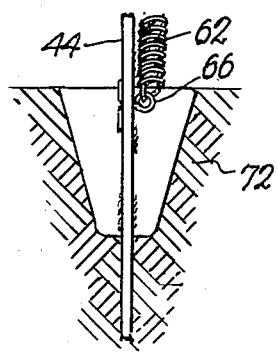
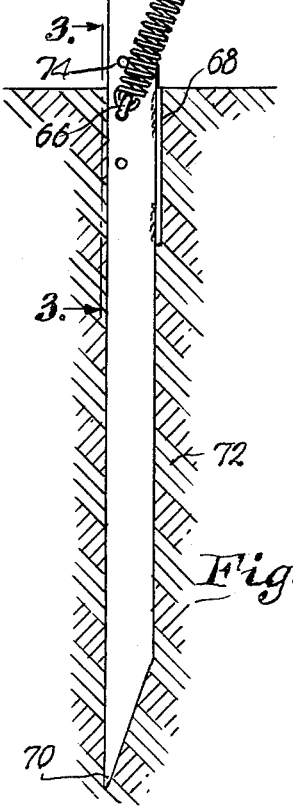
Fig. 1.
Fig. 2.
Fig. 3.

TRIPABLE FISHING ROD HOLDER

Fishermen traditionally complain of poor fishing expeditions with the excuse that the fish were not biting whereas the failures are oftentimes their own ineptness or awkwardness. Considerable experience is required to know when and how to set the hook even if the fisherman is sufficiently attentive to notice a nibble, a strike or the taking of the bait by the fish. Until such time as the bait and hook are actually within the mouth, all of which detection depends upon the sensitivity of the fisherman's fingers to the degree of tug on the line, a premature yank usually results in no more than a bare hook and loss of bait.

Various solutions in the form of tripable fishing rod holders have heretofore been suggested but, because of incorrect geometry and improper sensitivity of the holders to the tug on the line, none have been particularly successful.

In accordance with my invention, a latch ear, which locks with an eyelet, is so formed as to positively maintain the spring-loaded holder for the rod handle in a "cocked" position, yet be capable of instantaneous release only when the tug on the line is of such nature as to provide a sure catch.

Moreover, when using tackle equipped with a reel, knowledgeable fishermen usually form a loop in the line adjacent the reel and hold the loop lightly with their fingers to provide the necessary sensitivity to a fish interested in taking the bait. Hence, in my invention, that same loop is advantageously used as the instrumentality for tripping the latch.

In the drawing:

FIG. 1 is a side elevational view of a tripable fishing rod holder made pursuant to my present invention;

FIG. 2 is a fragmentary, cross-sectional view taken on line 22 of FIG. 1; and

FIG. 3 is a fragmentary, cross-sectional view taken on line 33 of FIG. 1.

The tripable fishing rod holder 10 shown in the drawing, operating as an automatic fish snagger, is used in connection with fishing tackle 12 which includes a rod 14 having a releasable connector 16 for attaching a mount 18 for a reel 20 from which extends a line 22 to the rod 14 and having a loop 24 therein which passes beneath an elongated, normally horizontal loop-receiving trip 26 extending laterally from a latch 30 and provided with a downwardly inclined, loop-retaining terminus 28 remote from the elongated, releasable latch 30 to which trip 26 is joined at the lowermost end of the latch 30 by a relatively tight pivotal connection 32, such as a bolt and nut, around which bolt the trip 26 is wrapped in a single convolution coil 34.

An elongated, normally horizontal, tiltable tubular support 36, receiving the handle (not shown) of the tackle 12, has a downturned lug 38 rigid thereto intermediate its ends 40 and 42 which attached to the upper end of an elongated, normally upright ground stake 44 by a rivet and washer 46 for swinging movement about a horizontal axis 48 transverse to the longitudinal axis of the stake 44 and parallel with the axis 50 of the bolt which is surrounded by the coil 34.

A normally horizontal, elongated bar 52 rigid to the stake 44 below, but adjacent to axis 48, extends laterally from the stake 44 toward the end 40 and serves as a mount for the latch 30 by use of a releasable fastener to permit swinging of the latch 30 about an axis 54 parallel with the axes 48 and 50 such that an ear 56 at the upper end of the latch 30 moves toward the stake 44 when unhooked from an eyelet 58, the latter of which is rigid to the support 36 adjacent the end 40. A series of holes 60 spaced longitudinally of the latch 30 selectively receive the pivotal fastener at axis 54 between the bar 52 and the latch 30.

The spring 62, stretched between the support 36 and the stake 44, yieldably biases the support 36 clockwise, viewing FIG. 1, is releasably attached to the support 36 by a cotter key 64 adjacent the end 42 and is releasably attached to the stake 44 intermediate the ends of the latter by a cotter key 66, the key 66 being adjacent a triangular anti-torque plate 68 rigid to the stake 44. The lower end of the stake 44 has a point 70 to facilitate forcing the stake 44 and the plate 68 into the ground 72, and the stake 44 has a series of openings 74 selectively receiving the key 66 to vary the tension of the spring 62.

OPERATION

The stake 44 and its plate 68 are forced into the ground 72, as facilitated by the point 70, at the bank of the fishing waters. The holder 10 is then swung in a counter-clockwise direction (viewing FIG. 1) about the axis 48 against the tension of the spring 62 and the latch 30 is swung in a counter-clockwise direction (viewing FIG. 1) until the ear 56 enters the eyelet 58 such as to maintain the holder 10 in an essentially horizontal position as shown by the full lines in FIG. 1.

The handle of the tackle 12 is then inserted through the end 40 of the holder 10 and the loop 24 is formed in the line 22, passing beneath the trip 26 adjacent the inclined terminus 28.

The latch 30 therefore becomes sensitive to a tug on the line 22 that is first transmitted to the loop 24, causing an upward movement in the trip 26 and a consequent swinging of the lower end of the latch 30 away from the stake 44. This results in a retraction of the ear 56 from within the eyelet 58 and a clockwise swinging of the holder 10 as well as the tackle 12 in response to the action of the spring 62, all as illustrated by dotted lines in FIG. 1.

This automatic fish snagger may be adjusted to suit various conditions. For example, the trip 26 may be swung up or down about the axis 50, thereby varying the length of the loop 24. The latch 30 may be attached to the bar mount 52 at various locations along the latch 30 by virtue of the series of holes 60 such as to change the attitude of the support 36 when cocked from horizontal (as shown) to various inclinations. And, the tension of the spring 62 may be varied by virtue of the series of openings 74 in the stake 44 accommodating the key 66 that connects the normally lowermost end of the spring 62 with the stake 44.

It is not contended that my invention is novel from the standpoint of providing the stake 44 within the ground 72, the provision of a tubular support 36 for the handle of the tackle 12, the provision of the axis 48 between the support 36 and the stake 44, or the use of the spring 66 for the purpose of biasing the support 36 in a direction to swing the tackle 12 upwardly and rearwardly toward the shoreline.

Nor is it new to provide a latch for the purpose of maintaining the support 36 cocked yet capable of being released by a tug on the line. Even the use of a loop in the line to trip the latch has heretofore been suggested.

However, the new and unexpected results attained by my invention are attributable to the relatively short coupling between the latch lip or ear 56 and the pivotal point 54, the adjustability of the lip engagement with the eyelet 58 by virtue of the series of holes 60 such as to vary the sensitivity of the release, the utilization of the loop-operated trip arm 26 adjustable on the latch 30 to suit varying conditions, and the overall geometry of the trip mechanism as above described.

Moreover, my device is novel by virtue of its foldability for compactness. When not in use, the spring 62 may be released at the cotter key 66, the support 36 swung clockwise about the axis 48 to a position lying closely adjacent the edge of the stake 44, the latch 30 swung to a position where its lower end is adjacent the stake 44, and the trip 26 also swung downwardly to a position alongside the stake 44.

In such compact condition, the entire assembly may be easily packaged for shipment in a relatively small carton and, when not in use, the fisherman is not confronted with a large assembly of parts that is bulky, difficult to handle, transport and store.

I claim:

1. For fishing tackle having a rod, a handle and a reel on the rod, a line leading from the reel to the rod and a loop in the line, an automatic fish snagger comprising:

an elongated normally upright ground stake;
   an elongated, normally horizontal, movable handle support on the stake and having an eyelet thereon;
   a coil spring interconnecting the stake and the support for yieldably biasing the latter in one direction;
   an elongated, releasable latch pivoted to the stake and including a hook normally engaging said eyelet for holding said support against movement in said one direction; and
   an elongated, normally horizontal, loop-receiving trip on the latch for releasing the latter in response to said fish tugging on said line,
   said stake having a series of openings spaced along its length for selective reception of said spring to vary the tension of the latter, and said latch having a series of holes spaced along its length for selective reception of said latch pivot for varying the sensitivity of the release of the hook from the eyelet.

2. For fishing tackle having a rod, a handle and a reel on the rod, a line leading from the reel to the rod and a loop in the line, an automatic fish snagger comprising:

an elongated, normally upright ground stake;
   an elongated, normally horizontal, movable handle support on the stake;
   a coil spring interconnecting the stake and the support for yieldably biasing the latter in one direction;
   an elongated, releasable latch carried by the stake and normally engaging the support for holding the latter against movement in said one direction; and
   an elongated, normally horizontal, loop-receiving trip on the latch for releasing the latter in response to said fish tugging on said line,
   said trip normally extending laterally from the latch at the lower end of the latter and having a downwardly inclined, loop-retaining terminus remote from the latch.

3. The invention of claim 2; and a pivotal connection between the trip and the latch, said connection being relatively tight for varying the angle between the trip and the latch and therefore, the sensitivity of the hook to said tug on the line.

* * * * *